(12) United States Patent
Bailey

(10) Patent No.: US 11,685,178 B2
(45) Date of Patent: Jun. 27, 2023

(54) METHODS AND SYSTEMS FOR EMULATING SPOT INKS OR OTHER COLORANTS

(71) Applicant: Global Graphics Software Limited, Cambridge (GB)

(72) Inventor: Martin Bailey, Cambridgeshire (GB)

(73) Assignee: GLOBAL GRAPHICS SOFTWARE LIMITED, Cambridge (GB)

( * ) Notice: Subject to any disclaimer, the term of this patent is extended or adjusted under 35 U.S.C. 154(b) by 250 days.

(21) Appl. No.: 17/165,275

(22) Filed: Feb. 2, 2021

(65) Prior Publication Data

US 2022/0242156 A1 Aug. 4, 2022

(51) Int. Cl.
*B41M 5/00* (2006.01)
*B41J 2/21* (2006.01)
*H04N 1/60* (2006.01)

(52) U.S. Cl.
CPC .......... *B41M 5/0023* (2013.01); *B41J 2/2114* (2013.01); *H04N 1/605* (2013.01); *H04N 1/6066* (2013.01)

(58) Field of Classification Search
CPC ... H04N 1/54; H04N 1/32309; B41M 5/0023; B41M 3/14; B41M 3/148; G06K 19/0614; G06T 1/0021; C09D 11/037
See application file for complete search history.

(56) References Cited

U.S. PATENT DOCUMENTS

| | | | |
|---|---|---|---|
| 6,456,395 B1* | 9/2002 | Ringness | H04N 1/54 358/1.9 |
| 7,612,926 B2* | 11/2009 | Jodra | H04N 1/54 358/1.9 |
| 2007/0121131 A1* | 5/2007 | Hauser | G06K 15/1835 358/1.9 |
| 2008/0252913 A1* | 10/2008 | Pepin | H04N 1/54 358/1.9 |
| 2015/0172510 A1* | 6/2015 | Davidson | H04N 1/6097 358/2.1 |
| 2016/0275326 A1* | 9/2016 | Falkenstern | G06T 1/0021 |
| 2017/0061563 A1* | 3/2017 | Falkenstern | B41M 3/14 |
| 2017/0257530 A1* | 9/2017 | Vanderhoydonck | H04N 1/6058 |
| 2019/0120695 A1* | 4/2019 | Liefferink | H04N 1/6033 |

* cited by examiner

*Primary Examiner* — John Zimmermann
(74) *Attorney, Agent, or Firm* — Branch Partners PLLC; Bruce E. Black

(57) ABSTRACT

A method for printing a document includes receiving the document, the document including at least one element to be printed using a combination of a spot color and a print effect; receiving a spot color emulation definition for the spot color and the print effect, the spot color emulation definition including a spot color name, an indication of a device-independent color space, values for the spot color in the device-independent color space, and an additional ink parameter indicating at least one additional ink to produce the print effect; and printing the document using the spot color emulation definition.

20 Claims, 4 Drawing Sheets

METHODS AND SYSTEMS FOR EMULATING SPOT INKS OR OTHER COLORANTS

FIELD

The present invention is directed to the area of document processing and printing. The present invention is also directed to methods and systems for emulation of spot inks or other colorants.

BACKGROUND

Many files prepared for professional printing workflows include combinations of process colors (usually CMYK- cyan, magenta, yellow, and black) by which the majority of the graphics are to be printed. The file may also include one or more spot colors which may be used to select specific visual appearances. One example of a spot color is a color that is important to a brand. Spot colors may be any color and may be defined and formulated by anyone, but many brands and printers will select spot colors by reference to the color books published by Pantone. Color books are also available from HKS, RAL, NCS, and others.

Historically, a spot color would be printed using a specific ink of the right color on the printer or press. More recently, a printing workflow will often utilize emulation of a spot color using a combination of process inks (e.g., CMYK inks). As an example, the PANTONE 286 C spot color is a royal blue that Pantone indicates may be emulated using 100% Cyan, 80% Magenta, 0% Yellow and 12% Black.

When a design to be printed is prepared to be sent to a printing company, the design will often be converted into a page description language (PDL), for example, PDF (the Portable Document File format) or PostScript. Both of these PDLs provide a mechanism to record the color of graphics with a spot color name. In addition, both of these PDLs provide a mechanism to encapsulate a recipe to emulate that color using process colorants. In practice, the alternate color representation is usually given as a formula combining CMYK inks or as a set of color values in a color space such as CIE 1976 $L^*a^*b^*$. Other color spaces may also be used.

Some alternate color spaces in CMYK may be described as being device-dependent color spaces, because the alternate color space does not, in itself, describe a specific color. Only when the color values are printed on a specific device (or interpreted according to an exchange color space such as ISOCoated) do the color values resolve to a color. On the other hand, CIE 1976 $L^*a^*b^*$ is a device-independent color space, which does specify a precise color.

A PDF or PostScript file can include a spot color that cannot or will not be used for printing a job that is processed in a prepress workflow or the DFE (digital front end) for a digital printer or press. That spot color can be emulated by treating all references to the spot color as if those references use an alternate color space, at least for the purposes of the color representation.

If a spot color is defined using a CMYK alternate color space, then objects printed using it will be treated as if they had been defined in CMYK. In at least some instances, the specified CMYK values may or may not produce a close match to the intended spot color when printed using a printer or press when the alternate color space is specified for a different device. For example, the process inks on many digital presses do not closely match those specified in standards describing printing inks for offset lithography or flexography and used on many conventional presses. Thus, printing a spot color using a digital press may not closely match the intended spot color due to the CMYK definition being designed for a non-digital press.

If a spot color has an $L^*a^*b^*$ alternate color space, then objects painted with it will be treated as if the spot color had been defined in $L^*a^*b^*$. In this case the $L^*a^*b^*$ values will be transformed through the output color profile used to represent the color achievable on the printer or press being used. As a result, the color reproduction of the spot color is more likely to be a good match to the desired spot color than would have been seen with a CMYK alternate color space (if the spot color is within the color gamut of that printer or press.)

But even with alternate color spaces specified in $L^*a^*b^*$ there is often a desire to fine tune the representation of spot colors on a specific printer or press at a specific print site to ensure that the brand or other entity who commissioned the printed matter will accept it. As a result, it is now common for prepress workflows and DFEs to include look-up tables for color values that will be used instead of the alternate color space for each spot that is specified in the submitted page description language.

As an example, Harlequin RIPs from Global Graphics Software can be configured with multiple "Named Color" resources that each specify the color space and color values to emulate one or more spot colors. Those may be specified in RGB, CMYK, a combination of arbitrary colorants or in XYZ (XYZ is another device- independent color space like $L^*a^*b^*$).

These solutions may successfully emulate spot colors that represent a color and nothing else, but a spot color may also represent other print effects as well as just the color. Examples may include, but are not limited to, metallic effects, pastel effects, fluorescent or "neon" effects, colored or non-colored varnish effects, glossy or matte effects, or the like or any combination thereof.

BRIEF SUMMARY

One embodiment is a method for printing a document. The method includes receiving the document, the document including at least one element to be printed using a combination of a spot color and a print effect; receiving a spot color emulation definition for the spot color and the print effect, the spot color emulation definition including a spot color name, an indication of a device-independent color space, values for the spot color in the device-independent color space, and an additional ink parameter indicating at least one additional ink to produce the print effect; and printing the document using the spot color emulation definition.

Another embodiment is a system for printing a document. The system includes a printing device; and at least one processor coupled to the printing device and configured and arranged to perform actions. The actions include receiving the document, the document including at least one element to be printed using a combination of a spot color and a print effect; receiving a spot color emulation definition for the spot color and the print effect, the spot color emulation definition including a spot color name, an indication of a device-independent color space, values for the spot color in the device-independent color space, and an additional ink parameter indicating at least one additional ink to produce the print effect; and printing the document using the spot color emulation definition.

Yet another embodiment is a non-transitory computer-readable medium having processor-executable instructions for printing a document, the processor-executable instructions when installed onto a device enable the device to perform actions. The actions include receiving the document, the document including at least one element to be printed using a combination of a spot color and a print effect; receiving a spot color emulation definition for the spot color and the print effect, the spot color emulation definition including a spot color name, an indication of a device-independent color space, values for the spot color in the device-independent color space, and an additional ink parameter indicating at least one additional ink to produce the print effect; and printing the document using the spot color emulation definition.

In at least some embodiments, the spot color emulation definition further includes a relative white point.

In at least some embodiments, printing the document includes defining a first object using the device-independent color space and the values for the spot color, defining a second object using a device-dependent color space and the at least one additional ink, and printing the first and second objects.

In at least some embodiments, printing the document includes using the spot color emulation definition to define an object emulating the spot color and the print effect by transforming the values for the spot color from the device-independent color space to a device-dependent color space that uses colorants of a printing device and including the at least one additional ink to produce the print effect, and printing the object.

In at least some embodiments, printing the document includes defining a first object by transforming the values for the spot color from the device-independent color space to a device-dependent color space that uses colorants of a printing device to emulate the spot color, defining a second object using the additional ink, and printing the first and second objects.

In at least some embodiments, the print effect is a metallic effect and the additional ink is a metallic ink. In at least some embodiments, the metallic ink is silver ink. In at least some embodiments, the metallic ink is a non-neutral metallic ink and printing the document using the spot color emulation definition includes using a color profile for the non-neutral metallic ink to transform the values for the spot color from the device-independent color space to a device dependent color space that uses colorants of a printing device to emulate the spot color.

In at least some embodiments, the print effect is a pastel effect and the additional ink is a white ink. In at least some embodiments, the print effect is a varnish or gloss/matte effect and the additional ink is a clear varnish ink, colored varnish ink, gloss varnish ink, or matte varnish ink.

In at least some embodiments, the print effect is a fluorescent effect and the additional ink is a fluorescent ink. In at least some embodiments, printing the document using the spot color emulation definition includes using a color profile for the fluorescent ink to transform the values for the spot color from the device-independent color space to a device dependent color space that uses colorants of a printing device to emulate the spot color.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

The present invention is directed to the area of document processing and printing. The present invention is also directed to methods and systems for emulation of spot inks or other colorants.

The methods, systems, and devices described herein may be embodied in many different forms and should not be construed as limited to the embodiments set forth herein. Accordingly, the methods, systems, and devices described herein may take the form of an entirely hardware embodiment, an entirely software embodiment or an embodiment combining software and hardware aspects. The following detailed description is, therefore, not to be taken in a limiting sense. The methods described herein can be performed using any type of processor and any suitable type of device that includes a processor.

Figure 1:
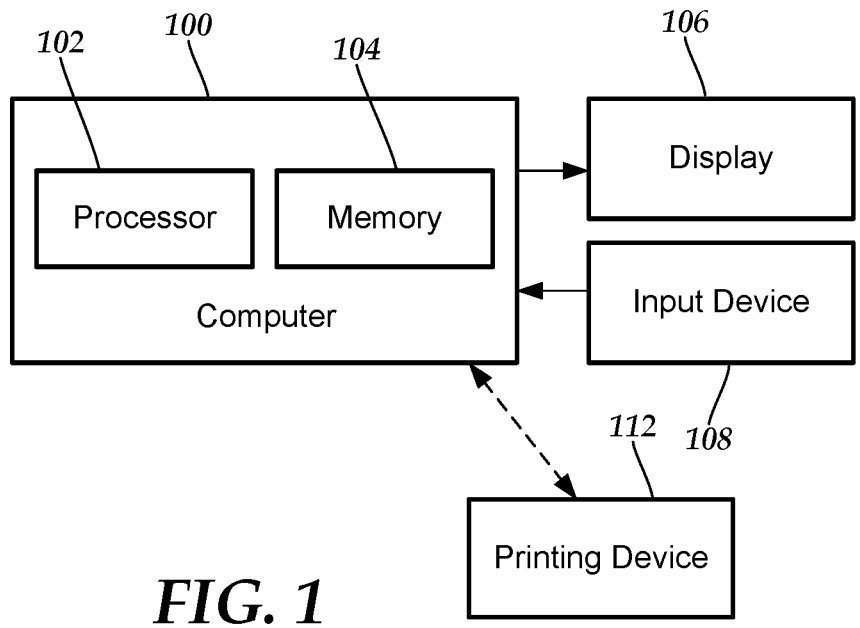
FIG. 1 is a schematic block diagram of one embodiment of a system for processing documents for printing, according to the invention.

FIG. 1 illustrates one embodiment of a system for practicing the invention. The system can include a computer 100 or any other device that includes a processor 102 and a memory 104, a display 106, an input device 108, and a printing device 112, such as a printer or press. The printing device 112 can be a digital press, a conventional press, an inkjet device, or any other suitable printing device. In some embodiments, one or more of the computer 100, display 106, or input device 108 can be part of the printing device 112.

The computer 100 can be a laptop computer, desktop computer, server computer, tablet, mobile device, smartphone, or other devices that can run applications or programs, or any other suitable device for processing information and for presenting a user interface. Alternatively or additionally, the computer 100 can be part of the printing device 112 or coupled (by wired or wireless coupling) to the printing device. The computer 100 can be local to the user or can include components that are non-local to the user including one or both of the processor 102 or memory 104 (or portions thereof). For example, in some embodiments, the user may operate a terminal that is connected to a non-local computer. In other embodiments, the memory can be non-local to the user.

The computer 100 can utilize any suitable processor 102 including one or more hardware processors that may be local to the user or non-local to the user or other components of the computer. The processor 102 is configured to execute instructions provided to the processor, as described below.

Any suitable memory 104 can be used for the computer 100. The memory 104 illustrates a type of computer-readable media, namely computer-readable storage media. Computer-readable storage media may include, but is not limited to, nonvolatile, non-transitory, removable, and non-removable media implemented in any method or technology for storage of information, such as computer readable instructions, data structures, program modules, or other data. Examples of computer-readable storage media include RAM, ROM, EEPROM, flash memory, or other memory technology, CD-ROM, digital versatile disks ("DVD") or other optical storage, magnetic cassettes, magnetic tape, magnetic disk storage or other magnetic storage devices, or any other medium which can be used to store the desired information and which can be accessed by a computer.

Communication methods provide another type of computer readable media; namely communication media. Communication media typically embodies computer- readable instructions, data structures, program modules, or other data in a modulated data signal such as a carrier wave, data signal, or other transport mechanism and include any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

The display 106 can be any suitable display device, such as a monitor, screen, display, or the like. The input device 108 can be, for example, a keyboard, mouse, touch screen, track ball, joystick, voice recognition system, or any combination thereof, or the like and can be used by the user to interact with a user interface.

Conventional methods to emulate spot colors that represent a color and nothing else are often adequate. However, a spot color may also represent other print effects as well as just the color. For example, metallic inks have been used to provide effects without the higher cost of foil stamping. Other print effects can include, but are not limited to, pastel effects, fluorescent or "neon" effects, colored or non-colored varnish effects, glossy or matte effects, or the like or any combination thereof. In the embodiments described herein, these print effects cannot be achieved by a combination of conventional CMYK or other typical printer/press inks, but instead include the use of an additional ink.

There are a number of sources of color books for colored metallic spot colors including, for example, PANTONE Metallics, Color-Logic, and Roland. The last two of these explicitly enable printing of many different colored metallic effects without requiring multiple metallic inks, by combining a metallic ink with a color printed in process inks such as CMYK. When used with relatively transparent colored inks (as many CMYK inks are) this can yield a wide selection of colors without unduly muting the metallic, reflective effect.

It will be useful to reliably print the combination of a special ink, such as a metallic ink, with process inks to accurately control an effect that goes beyond color. A colored metallic spot effect can be represented in a PDF or PostScript file using a variety of techniques. For example, the spot color can be specified in a device- dependent form, for example, as a DeviceN color space that includes values in Cyan, Magenta, Yellow, Black, and Metallic. As another example, the spot color can be specified as one object in Metallic, and a second object, set to overprint, in a device-independent color space such as L*a*b*.

Of these two examples, the first suffers from a similar challenge for any spot color: the specific mix of CMYK used for the color portion of the colored metallic spot may or may not be appropriate for any specific printer or press because the spot color is defined in a device dependent color space. In other words, the spot effect may not result in an accurate color representation on many printers or presses. The mechanism used to specify look-up-tables for emulating spot colors in a prepress workflow or DFE can vary by vendor and does not need to match what PDF or PostScript can do. But each should provide the result of that emulation for further processing to apply color management correctly.

If the second representation described above (the two-object example) is used, describing the design to be printed using both a device-dependent Metallic and a device-independent representation of the color, then the object that is to be colored is duplicated, one copy to be printed in metallic and one in device-independent colors. That means that the prepress workflow or DFE is no longer seeing a single graphic object that is specified to use a single-colored metallic spot.

It can be desirable to provide a device-independent definition of a spot color. To accomplish printing of the spot color with an additional print effect that is generated using an additional ink, a spot color emulation definition can include typical information such as a spot color name, an indication of a device-independent color space, values for the spot color in the device-independent color space, and, optionally, a relative white point. The device-independent spot color emulation definition also includes an additional ink parameter indicating the additional ink.

In at least some embodiments, the additional ink parameter may be a flag for a particular print effect such as, for example, metallic, pastel, fluorescent, varnish, gloss, matte, or the like. In at least some embodiments, the additional ink parameter simply indicates the identity of the additional ink without specifying the particular print effect. The identity of the additional ink can be a name of the additional ink or any other designator that is interpreted by the system (e.g., the printing device) as corresponding to a colorant available for printing by the system.

For example, in a CMYK arrangement, the additional ink will be a colorant other than cyan, magenta, yellow, or black. In at least some embodiments, the additional ink parameter can accept the names of two colorants, three colorants, four colorants, or any other number of colorants. It will be understood that the system and methods described herein can be used with process ink sets that are not CMYK. One common example is the use of additional inks such as Orange, Green, and Violet for an Extended Color Gamut (ECG or XG).

As an example of the device-independent spot color emulation definition, a bronze spot color named RVW-MT-24G (from the Roland DG library) might be represented as a JSON object such as:

```
{
  "SpotName": "RVW-MT-24G",
    "ColorSpace": "CIE 1976 L*a*b*",
    "RelativeWhitePoint": [ 94.48, 0.00, 0.04 ],
    "ColorValues": [ 52, 5, 55 ],
    AdditionalInks": [ "Silver" ]
}
```

Any other suitable object or other type of definition representation or syntax can be used.

In at least some embodiments, to achieve a metallic effect, the additional ink can be a metallic ink that has a neutral color itself, for example, a color contributes little or nothing to the color of the result. Silver is one example of a neutral color metallic ink. In other embodiments, a metallic ink with a non-neutral color can be used. In at least some embodiments, the non-neutral color is accounted for using a color profile for the non-neutral color or the metallic ink, as described in more detail below.

In at least some embodiments, to achieve a metallic effect, a medium with a metallic surface can be used. In such embodiments, the additional ink can be white ink. As graphic elements are processed from the design areas of the page, objects indicated as metallic will be printed directly on the medium without the white ink. For objects that are not metallic, the additional ink (i.e., white ink) is printed on the metallic surface of the medium. In at least some embodiments, the amount of white ink can be varied to provide partial metallic effects.

In at least some embodiments, to emulate a pastel color, white ink can be used as the additional ink. In at least some embodiments, the amount of white ink can be varied to moderate the pastel effect.

Fluorescent inks typically absorb ultraviolet (UV) light and then re-emit visible light. In at least some embodiments, to produce a fluorescent effect, a fluorescent ink can be used as the additional ink. In at least some embodiments, the non-neutral color of the fluorescent ink is accounted for using a color profile for the non-neutral color or the fluorescent ink, as described in more detail below. It should be noted than many process inks are effective at blocking the light emitted by the fluorescent effect and, therefore, the amount of process ink that can be used may be limited.

In at least some embodiments, to produce a varnish effect, a clear or colored varnish ink can be used as the additional ink. Varnish inks can also be used to provide matte or gloss finishes. Such varnish effects are often used for premium collateral and premium packaging and for other applications. In at least some embodiments, the color of a colored varnish ink is accounted for using a color profile for the color or the colored varnish ink, as described in more detail below.

The prepress workflow or DFE may process the device-independent spot color emulation definition in any suitable manner when it encounters a spot color by that name in a print job (e.g., a document). For example, the prepress workflow or DFE may process the device-independent spot color emulation definition to duplicate the graphic element, setting one object to the device-independent color space and the other to a device-dependent representation of the additional ink(s). As another example, the prepress workflow or DFE may process the device-independent spot color emulation definition to use the currently specified output color profile to transform the device- independent color to a device-dependent color space using inks available on the printing device and then print the object using those inks, including the additional ink. The output color profile for the printing device, or the additional color profile referenced from the spot emulation look-up table, can be used to transform the device-independent emulation color into any set of process inks (for example, CMYK process inks.)

The prepress workflow or DFE processing preferably also includes the consideration of overprinting and PDF transparency involving the spot colors. As an example, in at least some instances, printing the process inks over a metallic ink will affect the way in which the process inks reproduce color due to, for example, the metallic ink having a non-neutral color or the process inks adhering differently to the metallic ink than to the media. Other examples include, but are not limited to, fluorescent inks or colored varnishes. The system may include a look-up table with a pointer to a separate color profile that will be used to transform the device-independent color values into process ink values where the look-up table is also associated with the use of an additional ink or with a specific type or name of the additional ink. For example, such a color profile can be generated by measuring test pages printed in process inks on top of an additional ink or the specific additional ink or the specific type of additional ink. Because a pointer is used rather than the color profile being built into the look-up table itself the look-up table is still usable across many combinations or printing device and media.

Figure 2:
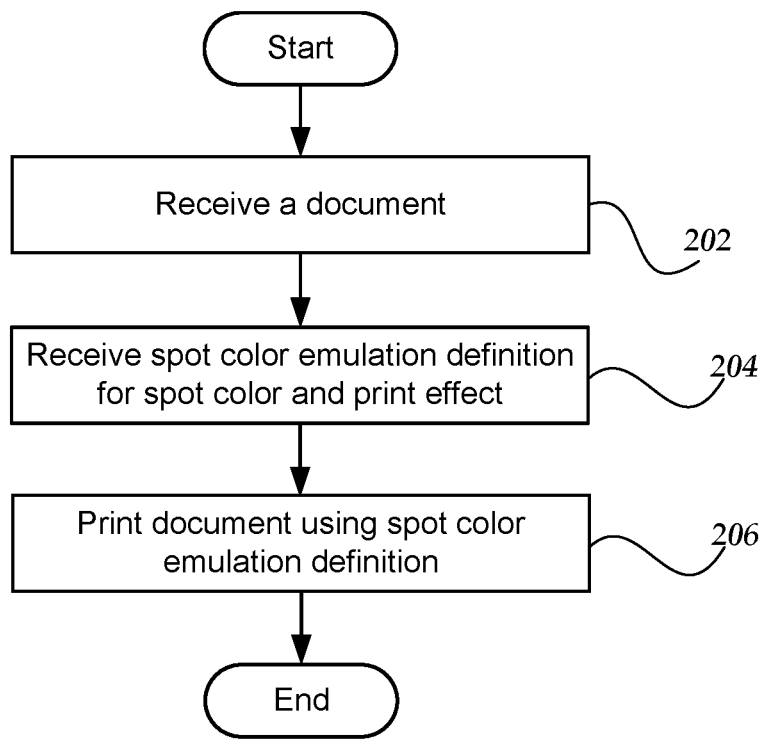
FIG. 2 is a schematic flowchart of one embodiment of a method of printing a document, according to the invention.

FIG. 2 is a flow chart of one method of printing a document. The term "document", as used herein, includes, but is not limited to, text, graphics, images, or other graphical elements or any combination thereof. A "document" can be single page or multi-page or may represent only part of a page or may not be paginated at all.

In step 202, the document is received for processing. The document may be received from another source or may be developed (or partially developed) on the computer 100. The document includes at least one element to be printed using a combination of a spot color and a print effect. Examples of print effects include, but are not limited to, metallic effects, pastel effects, fluorescent or "neon" effects, colored or non-colored varnish effects, glossy or matte effects.

In step 204, a spot color emulation definition for the spot color and print effect is received. The spot color emulation definition includes parameters such as, for example, a spot color name, an indication of a device-independent color space, values for the spot color in the device-independent color space, an additional ink parameter indicating at least one additional ink to produce the print effect, or a relative white point, or the like or any combination thereof.

In step 206, the document is printed on a printing device using the spot color emulation definition. The printing device may utilize the spot color values in the device-independent color space to print the spot color or may transform the spot color values into a device-dependent color space to print the spot color. In at least some embodiments, the printing device may utilize a device profile or other profile (for example, a color profile for the additional ink(s)) or a combination or sequential application of two or more profiles for the transformation. In at least some embodiments, the printing device uses process inks (for example, CMYK inks or RGB inks) to print the spot color. The document may be printed using a device that also performed steps 202 and 204 or the processed document may be delivered to a printing device for printing.

Figure 3:
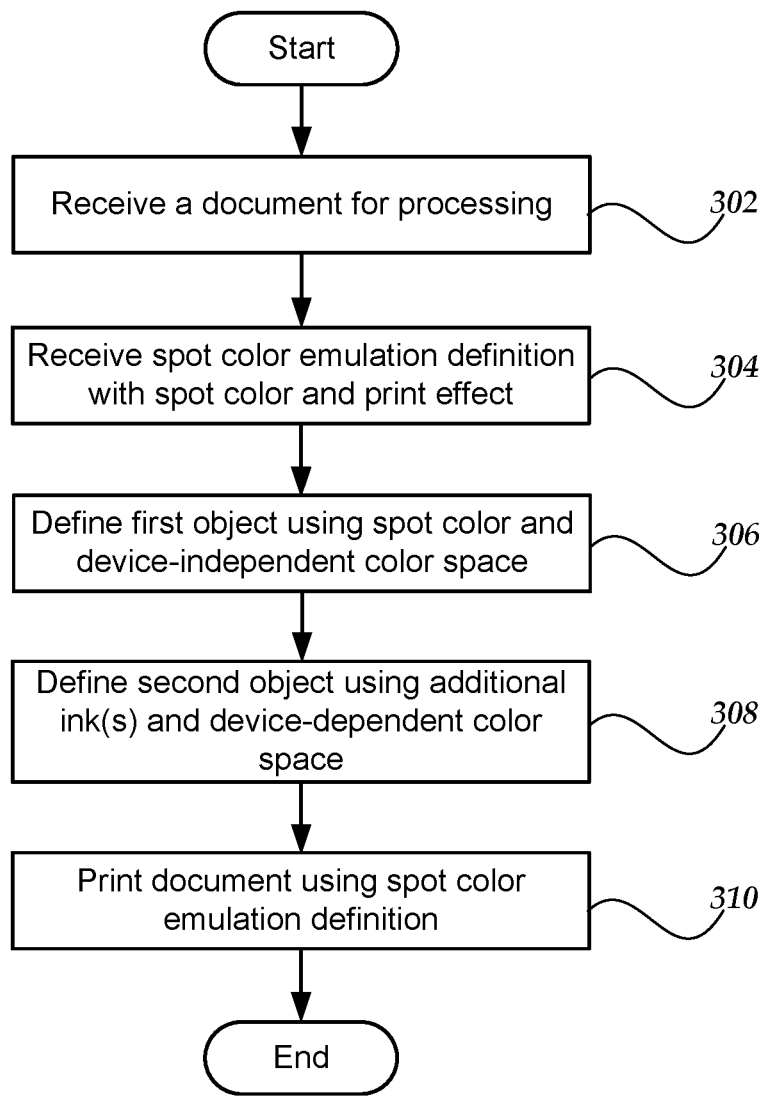
FIG. 3 is a schematic flowchart of another embodiment of a method of printing a document, according to the invention.

FIG. 3 is a flow chart of another method of printing a document. Steps 302 and 304 are the same as steps 202 and 204 described above.

In step 306, a first object is defined using the device-independent color space and the spot color. In step 308, a second object is defined using a device-dependent color space and the at least one additional ink.

In step 310, the document is printed on a printing device using the spot color emulation definition including printing the first and second objects. The order of the printing of the first and second objects can be selected as appropriate or desired. For example, in at least some embodiments, the second object is printed before the first object when at least one of the additional ink(s) is a metallic ink. As another example, in at least some embodiments, the first object is printed before the second object when at least one additional ink(s) is varnish ink, gloss ink, or matte ink. The printing device may utilize the spot color values in the device-independent color space to print the first object or may transform the spot color values into a device-dependent color space to print the first object. In at least some embodiments, the printing device may utilize a device profile or other profile (for example, a color profile for the additional ink(s)) or a combination or sequential application of two or more profiles for the transformation. In at least some embodiments, the printing device uses process inks (for example, CMYK inks or RGB inks) to print the first object. The document may be printed using a device that also performed steps 302, 304, 306, and 308 or the processed document may be delivered to a printing device for printing.

Figure 4:
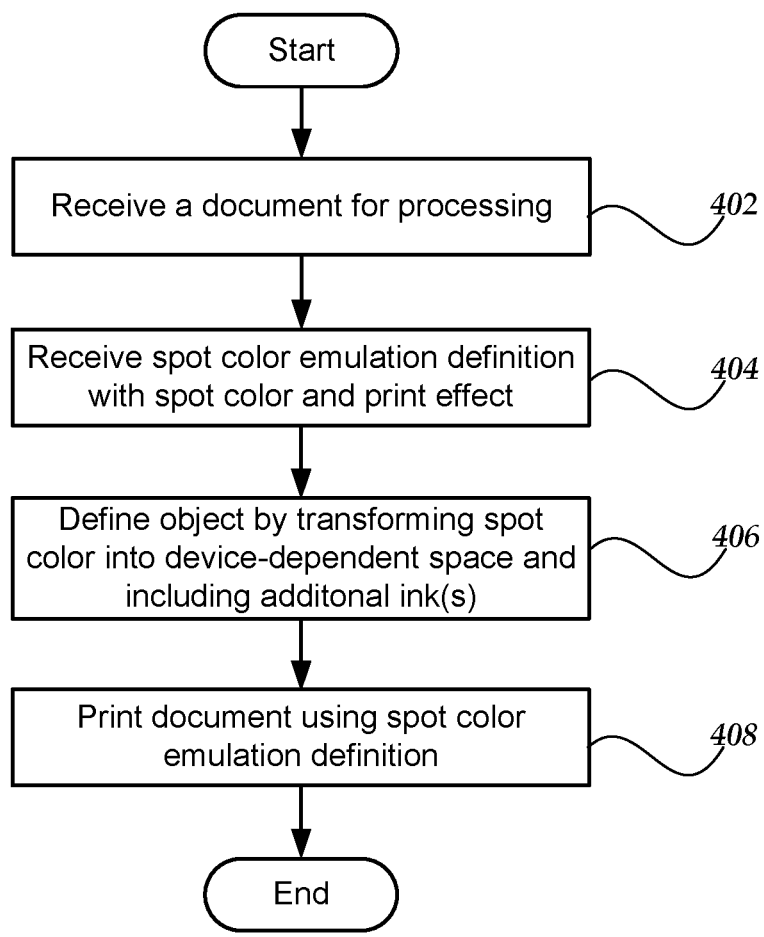
FIG. 4 is a schematic flowchart of a third embodiment of a method of printing a document, according to the invention.

FIG. 4 is a flow chart of yet another method of printing a document. Steps 402 and 404 are the same as steps 202 and 204 described above.

In step 406, an object is defined by transforming the values for the spot color from the device-independent color space to a device-dependent color space that uses colorants of a printing device and including the at least one additional ink to produce the print effect. In at least some embodiments, the printing device may utilize a device profile or other profile (for example, a color profile for the additional ink(s)) or a combination or sequential application of two or more profiles for the transformation.

In step 408, the document is printed on a printing device using the spot color emulation definition including printing the object. In at least some embodiments, the printing device uses process inks (for example, CMYK inks or RGB inks) to print the first object. The document may be printed using a device that also performed steps 402, 404, and 406 or the processed document may be delivered to a printing device for printing.

Figure 5:
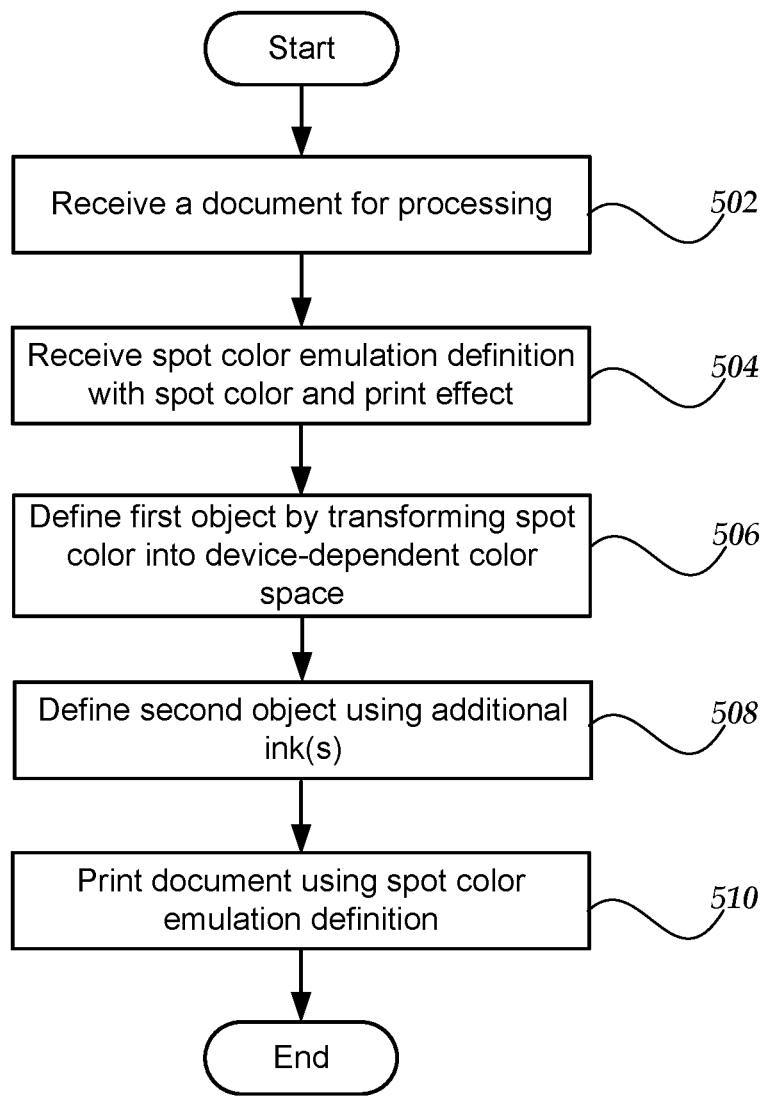
FIG. 5 is a schematic flowchart of a fourth embodiment of a method of printing a document, according to the invention.#

FIG. 5 is a flow chart of a further method of printing a document. Steps 502 and 504 are the same as steps 202 and 204 described above.

In step 506, a first object is defined by transforming the values for the spot color from the device-independent color space to a device-dependent color space that uses colorants of a printing device. In at least some embodiments, the printing device may utilize a device profile or other profile (for example, a color profile for the additional ink(s)) or a combination or sequential application of two or more profiles for the transformation. In step 508, a second object is defined using a device-dependent color space and the at least one additional ink.

In step 510, the document is printed on a printing device using the spot color emulation definition including printing the first and second objects. The order of the printing of the first and second objects can be selected as appropriate or desired. For example, in at least some embodiments, the second object is printed before the first object when at least one of the additional ink(s) is a metallic ink. As another example, in at least some embodiments, the first object is printed before the second object when at least one additional ink(s) is varnish ink, gloss ink, or matte ink. In at least some embodiments, the printing device uses process inks (for example, CMYK inks or RGB inks) to print the first object. The document may be printed using a device that also performed steps 502, 504, 506, and 508 or the processed document may be delivered to a printing device for printing.

The methods and systems described herein may be embodied in many different forms and should not be construed as limited to the embodiments set forth herein.

Accordingly, the methods and systems described herein may take the form of an entirely hardware embodiment, an entirely software embodiment or an embodiment combining software and hardware aspects. Systems referenced herein typically include memory and typically include methods for communication with other devices including mobile devices. Methods of communication can include both wired and wireless (e.g., RF, optical, or infrared) communications methods and such methods provide another type of computer readable media; namely communication media. Wired communication can include communication over a twisted pair, coaxial cable, fiber optics, wave guides, or the like, or any combination thereof. Wireless communication can include RF, infrared, acoustic, near field communication, Bluetooth®, or the like, or any combination thereof.

It will be understood that each block of the flowchart illustrations, and combinations of blocks in the flowchart illustrations and methods disclosed herein, can be implemented by computer program instructions. These program instructions may be provided to a processor to produce a machine, such that the instructions, which execute on the processor, create means for implementing the actions specified in the flowchart block or blocks disclosed herein. The computer program instructions may be executed by a processor to cause a series of operational steps to be performed by the processor to produce a computer implemented process. The computer program instructions may also cause at least some of the operational steps to be performed in parallel. Moreover, some of the steps may also be performed across more than one processor, such as might arise in a multi-processor computer system. In addition, one or more processes may also be performed concurrently with other processes, or even in a different sequence than illustrated without departing from the scope or spirit of the invention.

The computer program instructions can be stored on any suitable computer-readable medium including, but not limited to, RAM, ROM, EEPROM, flash memory or other memory technology, CD-ROM, digital versatile disks ("DVD") or other optical storage, magnetic cassettes, magnetic tape, magnetic disk storage or other magnetic storage devices, or any other medium which can be used to store the desired information and which can be accessed by a computer.

The above specification provides a description of the manufacture and use of the invention. Since many embodiments of the invention can be made without departing from the spirit and scope of the invention, the invention also resides in the claims hereinafter appended.

What is claimed as new and desired to be protected by Letters Patent of the United States is:

1. A method for printing a document, the method comprising:
   receiving the document, the document comprising at least one element to be printed using a combination of a spot color and a print effect;
   receiving a spot color emulation definition for the spot color and the print effect, the spot color emulation definition comprising a spot color name, a name or other designator specifying a device-independent color space that is used for defining a color of the spot color, values for the spot color in the device-independent color space, and an additional ink parameter indicating at least one additional ink to produce the print effect; and
   printing the document using the spot color emulation definition.

2. The method of claim 1, wherein the spot color emulation definition further comprises a relative white point.

3. The method of claim 1, wherein printing the document comprises defining a first object using the device-independent color space and the values for the spot color, defining a second object using a device-dependent color space and the at least one additional ink, and printing the first and second objects.

4. The method of claim 1, wherein printing the document comprises using the spot color emulation definition to define an object emulating the spot color and the print effect by transforming the values for the spot color from the device-independent color space to a device-dependent color space that uses colorants of a printing device and including the at least one additional ink to produce the print effect, and printing the object.

5. The method of claim 1, wherein printing the document comprises defining a first object by transforming the values for the spot color from the device-independent color space to a device-dependent color space that uses colorants of a printing device to emulate the spot color, defining a second object using the additional ink, and printing the first and second objects.

6. The method of claim 1, wherein the print effect is a metallic effect and the additional ink is a metallic ink.

7. The method of claim 6, wherein the metallic ink is silver ink.

8. The method of claim 6, wherein the metallic ink is a non-neutral metallic ink and printing the document using the spot color emulation definition comprises using a color profile for the non-neutral metallic ink to transform the values for the spot color from the device-independent color space to a device-dependent color space that uses colorants of a printing device to emulate the spot color.

9. The method of claim 1, wherein the print effect is a pastel effect and the additional ink is a white ink.

10. The method of claim 1, wherein the print effect is a fluorescent effect and the additional ink is a fluorescent ink.

11. The method of claim 10, wherein printing the document using the spot color emulation definition comprises using a color profile for the fluorescent ink to transform the values for the spot color from the device-independent color space to a device-dependent color space that uses colorants of a printing device to emulate the spot color.

12. The method of claim 1, wherein the print effect is a varnish or gloss/matte effect and the additional ink is a clear varnish ink, colored varnish ink, gloss varnish ink, or matte varnish ink.

13. A system for printing a document, the system comprising:

a printing device; and at least one processor coupled to the printing device and configured and arranged to perform actions, the actions comprising:

receiving the document, the document comprising at least one element to be printed using a combination of a spot color and a print effect;

receiving a spot color emulation definition for the spot color and the print effect, the spot color emulation definition comprising a spot color name, a name or other designator specifying a device-independent color space that is used for defining a color of the spot color, values for the spot color in the device-independent color space, and an additional ink parameter indicating at least one additional ink to produce the print effect; and printing the document using the spot color emulation definition.

14. The system of claim 13, wherein printing the document comprises defining a first object using the device-independent color space and the values for the spot color, defining a second object using a device-dependent color space and the at least one additional ink, and printing the first and second objects.

15. The system of claim 13, wherein printing the document comprises using the spot color emulation definition to define an object emulating the spot color and the print effect by transforming the values for the spot color from the device-independent color space to a device-dependent color space that uses colorants of a printing device and including the at least one additional ink to produce the print effect, and printing the object.

16. The system of claim 13, wherein printing the document comprises defining a first object by transforming the values for the spot color from the device-independent color space to a device-dependent color space that uses colorants of a printing device to emulate the spot color, defining a second object using the additional ink, and printing the first and second objects.

17. A non-transitory computer-readable medium having processor-executable instructions for printing a document, the processor-executable instructions when installed onto a device enable the device to perform actions, the actions comprising:

receiving the document, the document comprising at least one element to be printed using a combination of a spot color and a print effect;

receiving a spot color emulation definition for the spot color and the print effect, the spot color emulation definition comprising a spot color name, a name or other designator specifying a device-independent color space that is used for defining a color of the spot color, values for the spot color in the device-independent color space, and an additional ink parameter indicating at least one additional ink to produce the print effect; and printing the document using the spot color emulation definition.

18. The non-transitory computer-readable medium of claim 17, wherein printing the document comprises defining a first object using the device-independent color space and the values for the spot color, defining a second object using a device-dependent color space and the at least one additional ink, and printing the first and second objects.

19. The non-transitory computer-readable medium of claim 17, wherein printing the document comprises using the spot color emulation definition to define an object emulating the spot color and the print effect by transforming the values for the spot color from the device-independent color space to a device-dependent color space that uses colorants of a printing device and including the at least one additional ink to produce the print effect, and printing the object.

20. The non-transitory computer-readable medium of claim 17, wherein printing the document comprises defining a first object by transforming the values for the spot color from the device-independent color space to a device-dependent color space that uses colorants of a printing device to emulate the spot color,
defining a second object using the additional ink, and
printing the first and second objects.

* * * * *